US012443936B2

(12) United States Patent
Jivan et al.

(10) Patent No.: US 12,443,936 B2
(45) Date of Patent: Oct. 14, 2025

(54) INTEGRATING REQUESTS ACROSS DIFFERENT ONLINE APPLICATIONS

(71) Applicant: OBeP Payments, LLC, San Carlos, CA (US)

(72) Inventors: Malathi Jivan, San Carlos, CA (US); Eric Foust, Hudson, OH (US); Gustavo Varejao, Seattle, WA (US)

(73) Assignee: OBeP Payments, LLC, San Carlos, CA (US)

( * ) Notice: Subject to any disclaimer, the term of this patent is extended or adjusted under 35 U.S.C. 154(b) by 170 days.

(21) Appl. No.: 18/109,446

(22) Filed: Feb. 14, 2023

(65) Prior Publication Data

US 2023/0274243 A1     Aug. 31, 2023

Related U.S. Application Data

(60) Provisional application No. 63/309,976, filed on Feb. 14, 2022.

(51) Int. Cl.
*G06Q 20/08* (2012.01)
*G06Q 20/10* (2012.01)
*G06Q 20/32* (2012.01)
*G06Q 20/40* (2012.01)

(52) U.S. Cl.
CPC ......... *G06Q 20/108* (2013.01); *G06Q 20/326* (2020.05); *G06Q 20/4016* (2013.01)

(58) Field of Classification Search
CPC .................................................. G06Q 20/326
See application file for complete search history.

(56) References Cited

U.S. PATENT DOCUMENTS

| | | | |
|---|---|---|---|
| 2013/0197998 A1* | 8/2013 | Buhrmann | H04M 1/27 726/3 |
| 2022/0083994 A1* | 3/2022 | Jamkhedkar | G06Q 20/102 |
| 2022/0222650 A1* | 7/2022 | Shauh | G06Q 20/401 |

FOREIGN PATENT DOCUMENTS

CA       3189576       8/2023

OTHER PUBLICATIONS

U.S. Pat. No. 3,189,576, CA, Malathi Jivan, Integrating Requests Across Different Online Applications, Feb. 14, 2023.

* cited by examiner

*Primary Examiner* — Edward Chang
(74) *Attorney, Agent, or Firm* — Polsinelli LLP

(57) ABSTRACT

The present technology can integrate online transaction requests across different combinations of online applications to streamline approvals. A software connector is integrated to retrieve necessary information from digital banking applications, such that an approval process remains in a single application interface (e.g., of a merchant website or online application). The software connector polls for a notification from a respective banking application and presents the notification in a lightbox on the merchant website or application.

22 Claims, 6 Drawing Sheets

INTEGRATING REQUESTS ACROSS DIFFERENT ONLINE APPLICATIONS

CROSS-REFERENCE TO RELATED APPLICATION

The present patent application claims the priority benefit of U.S. Provisional Application No. 63/309,976 filed Feb. 14, 2022, the disclosure of which is incorporated by reference herein in its entirety.

BACKGROUND OF THE INVENTION

1. Field of the Disclosure

The present technology generally relates to a method for streamlining and facilitating approvals for requests associated with online transactions, and in particular, for integrating the requests across different online applications to streamline approval processes.

2. Description of the Related Art

Online transactions, such as may occur at websites or using web-based applications, may require a specialized process call Request for Payments (RfPs). RfP processes may include a "pull payment" whereby a payee can initiate an online request (RfP) for a specific payment from the payer. The RfP may then be received on the payer mobile device (including on a digital banking application). Then, the payer either approves or rejects the request on the banking application, and if approved, automatically initiates a real-time credit transfer to the payee. RfPs may be cleared and processed by real-time payment (RTP) networks, such as The Clearing House Real Time Payment Network. Prior art configurations for processing such RfPs have required that the user leave a current webpage in order to access other (e.g., external or third-party) webpages, enter user input thereon, and obtain the necessary approvals for an online transaction to be completed. Thus, such traditional method requires the user to switch to a different application, such that there is a handoff between different applications, which later requires a corresponding handoff back to the original application. Requiring multiple handoffs between different online applications increases the risk that the transaction may not be completed. Such configurations may also result in a fractured user experience across the different webpages, as well as being prone to disruption.

There is, therefore, a need in the art for a more seamless user experience.

SUMMARY OF THE CLAIMED INVENTION

Disclosed are systems, apparatuses, methods, computer-readable medium, and circuits for integrating requests across different online applications. According to at least one example, a method includes: storing information regarding a plurality of connectors in memory, wherein each connector is associated with a different online application; receiving a request associated with a user accessing a first online application, wherein the user is associated with a second online application; identifying a connector from among the stored connectors that is associated with the second online application; triggering the second online application via the identified connector, wherein the second online application is triggered to originate a request in accordance with the request received associated with the user accessing the first online application; and generating a notification display associated the first online application, wherein the notification display presents the request originated by the second online application without requiring the user to leave the first online application.

For example, the payment facilitation system stores information regarding a plurality of connectors in memory, wherein each connector is associated with a different online application; receives a request associated with a user accessing a first online application, wherein the user is associated with a second online application; identifies a connector from among the stored connectors that is associated with the second online application; triggers the second online application via the identified connector, wherein the second online application is triggered to originate a request in accordance with the request received associated with the user accessing the first online application; and generates a notification display associated the first online application, wherein the notification display presents the request originated by the second online application without requiring the user to leave the first online application.

In another example, a payment facilitation system for integrating requests across different online applications is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the payment facilitation system to: store information regarding a plurality of connectors in memory, wherein each connector is associated with a different online application; receive a request associated with a user accessing a first online application, wherein the user is associated with a second online application; identify a connector from among the stored connectors that is associated with the second online application; trigger the second online application via the identified connector, wherein the second online application is triggered to originate a request in accordance with the request received associated with the user accessing the first online application; and generate a notification display associated the first online application, wherein the notification display presents the request originated by the second online application without requiring the user to leave the first online application.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Aspects of the disclosed technology provide solutions for streamlining approval processes associated with Request for Payments (RfPs) by integrating a software connector that retrieves necessary information from digital (e.g., online) banking applications, such that the entire approval process may be consolidated into a single application interface. As discussed herein, the present technology identifies when a user initiates an RfP process on a merchant website and provides a software connector that acts as a proxy on the banking application associated with the user, polls for a notification from a respective banking application, and presents the notification via a lightbox user interface via the merchant website. The lightbox user interface may be a pop-up window or new screen overlay that appears once the user clicks the checkout or payment box. As a result, the user does not need to leave the merchant website to use the lightbox user interface for transaction approvals, thereby providing for a more consistent and streamlined user experience. As discussed in further detail below, aspects of the technology can be implemented using an application programming interface (API), for example, that is configured to serve as the software connector to the specific website, application, and/or banking system. There may therefore be a number of different software connectors (or APIs) configured to communicate with different entity websites, applications, and/or systems and to generate a custom lightbox user interface.

Figure 1:
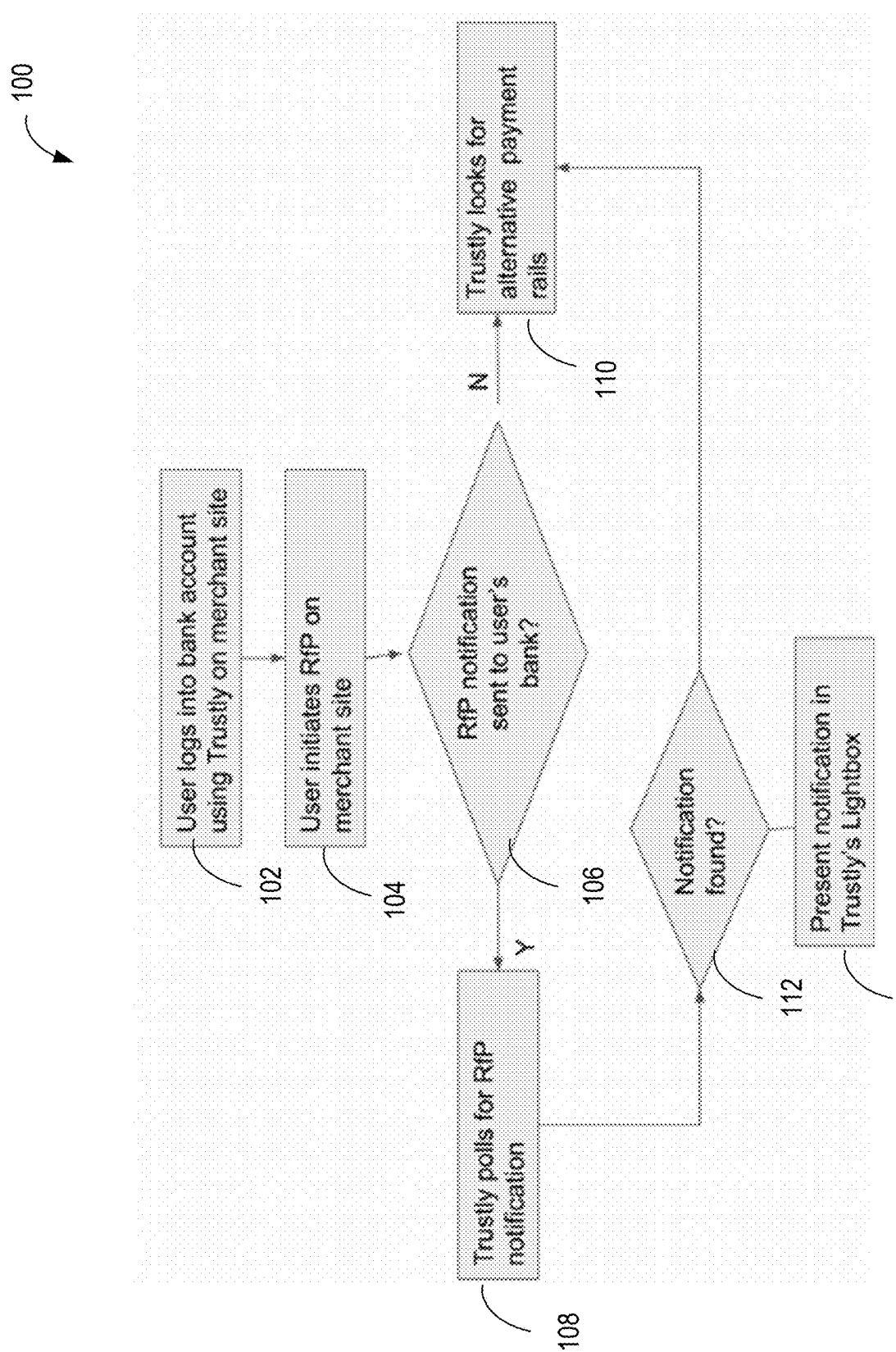
FIG. 1 illustrates an example flow diagram 100 for streamlining approvals for RfPs, according to some aspects of the disclosed technology.

FIG. 1 illustrates an example flow diagram 100 for streamlining approvals for RfPs. The user may log into a banking application using the software connector on a merchant website at a user device in step 102, such as via the lightbox at the merchant website. The lightbox may be provided by the software connector or remote system associated with the software connector. By logging into the banking system using the software connection, the software connector performs functions on the back-end that are hidden or otherwise not made visible at a display of the user device. The user may initiate an RfP process on the merchant website in step 104.

When the RfP process is initiated, the merchant website triggers an RfP to be sent from the merchant's banking system to the user account of the user's banking system. The software connector may then poll for the RfP notification as a proxy within the user account of the banking application. If the notification is found, the notification or confirmation request is presented in the same lightbox at the merchant website. If the notification is not found, the software connector may consider alternative payment rails. In some implementations, the disclosed technology also can create multiple or split payments based on one or more other software connectors via the lightbox user interface.

Figure 2:
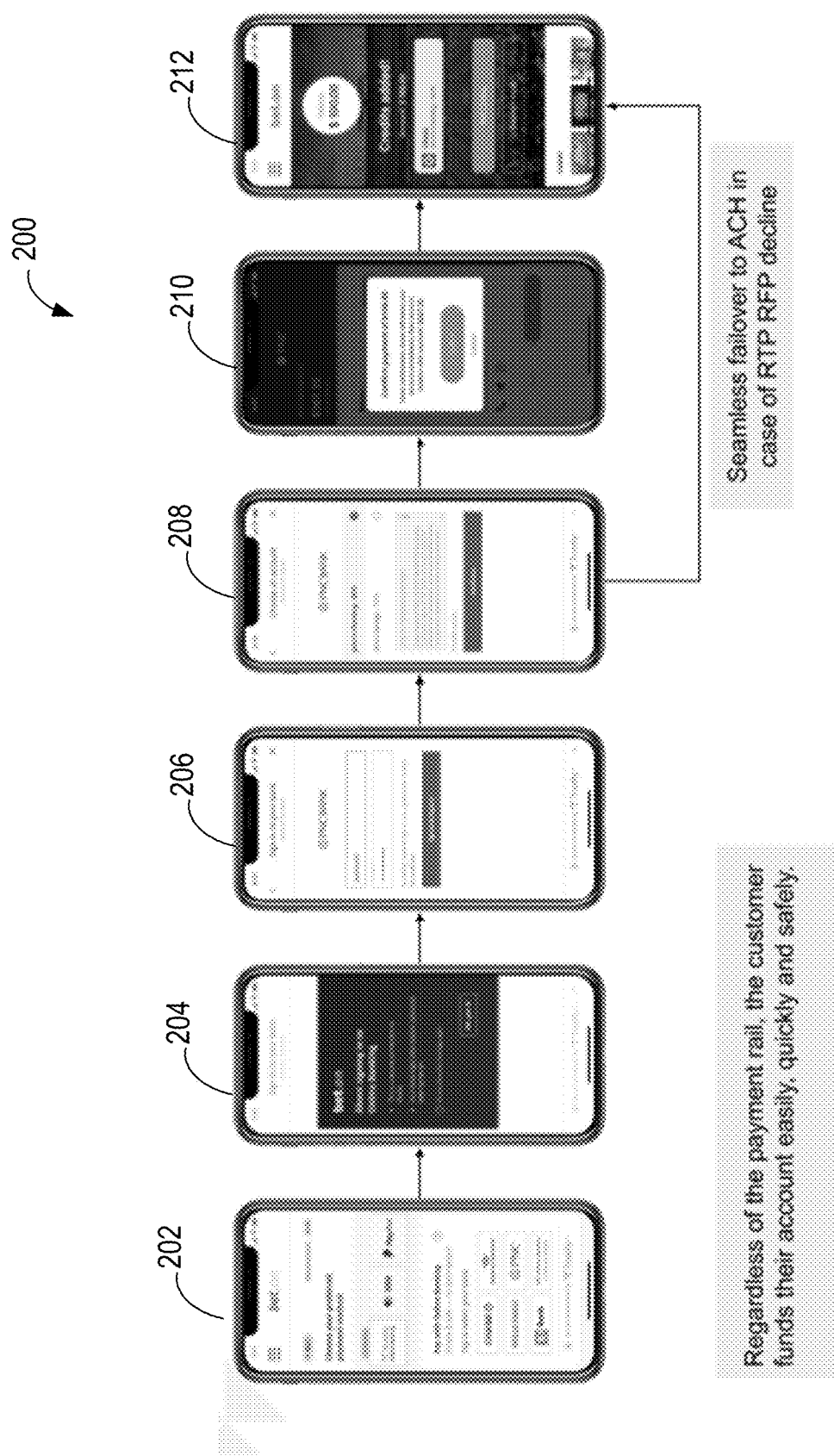
FIG. 2 illustrates example graphical user interfaces (GUIs) for streamlining approvals for RfPs, according to some aspects of the disclosed technology.

FIG. 2 illustrates example graphical user interfaces (GUIs) for streamlining approvals for RfPs. In a first screen 202, options for payment facilitation methods may be presented. Once a banking system is selected, in a second screen 204, a permission request may be presented to confirm that the user is allowing the software connector to sign into the banking system as a proxy for the user. Once confirmed, in a third screen 206, a sign-in screen for signing into the banking system may be presented. Once signed in, in a fourth screen 208, a bank account may be selected from one or more bank accounts associated with the user account, wherein the bank account selected is the account in which the payment would be drawn.

Once the bank account is confirmed, in a fifth screen 210, a confirmation pop-up may be displayed to confirm that the RfP proceeds and that the irrevocable payment be confirmed to be processed. The processing and transferring of the payment is performed separately and not by the software connector. Once confirmed, there may be a seamless failover to Automated Clearing House (ACH) in case the real-time payment of the RfP is declined. As the example shown in a sixth screen 212, the real-time payment may be credits added at the merchant website, paid by a payment from the selected bank account. Therefore, regardless of payment rail, the customer funds their account or pays for goods and services easily, quickly, and safely.

Figure 3A:
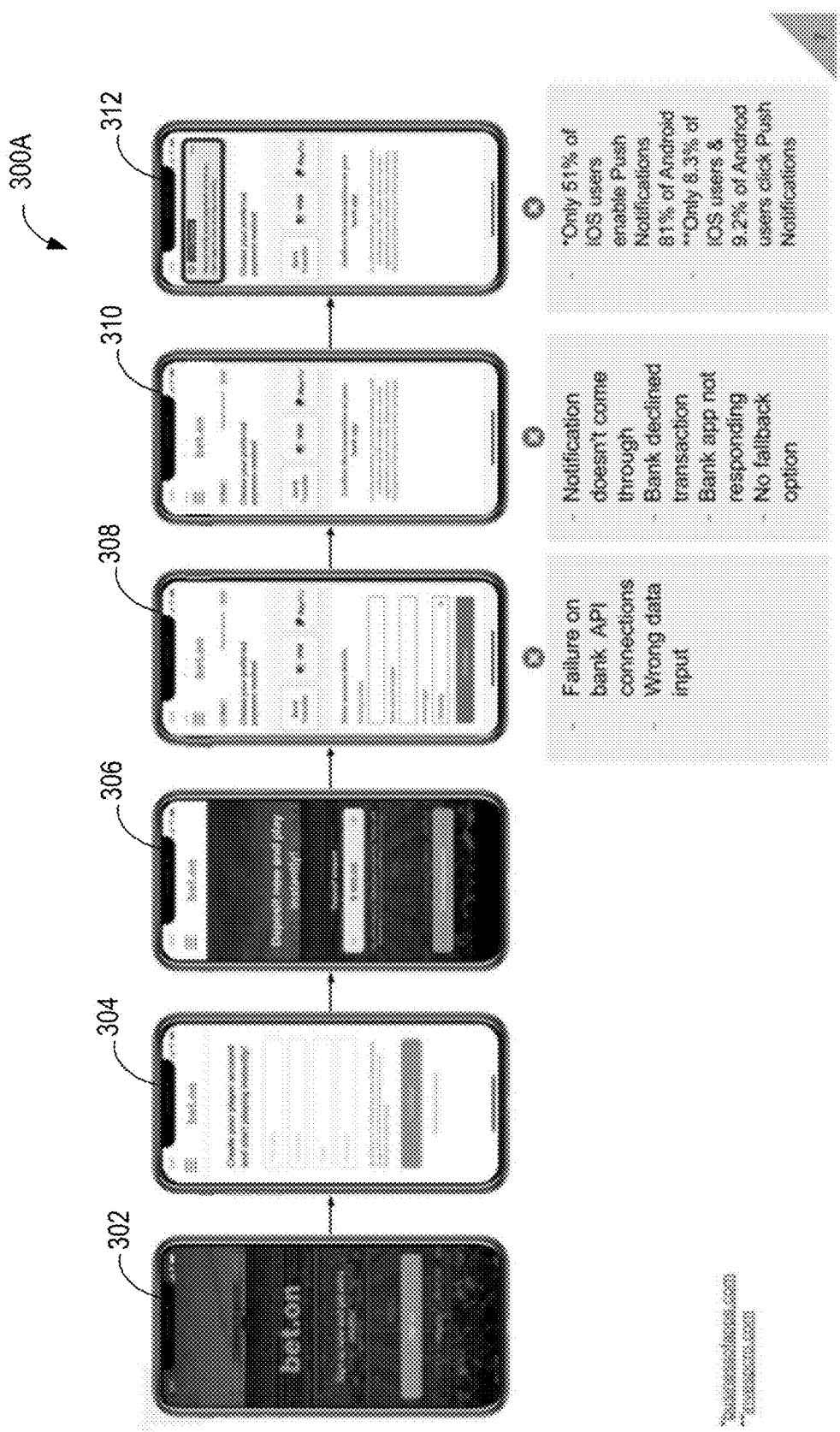
FIGS. 3A-3B illustrate example graphical user interfaces (GUIs) without the streamlined method of the present technology and certain technical issues that can occur, according to some aspects of the disclosed technology.
Figure 3B:
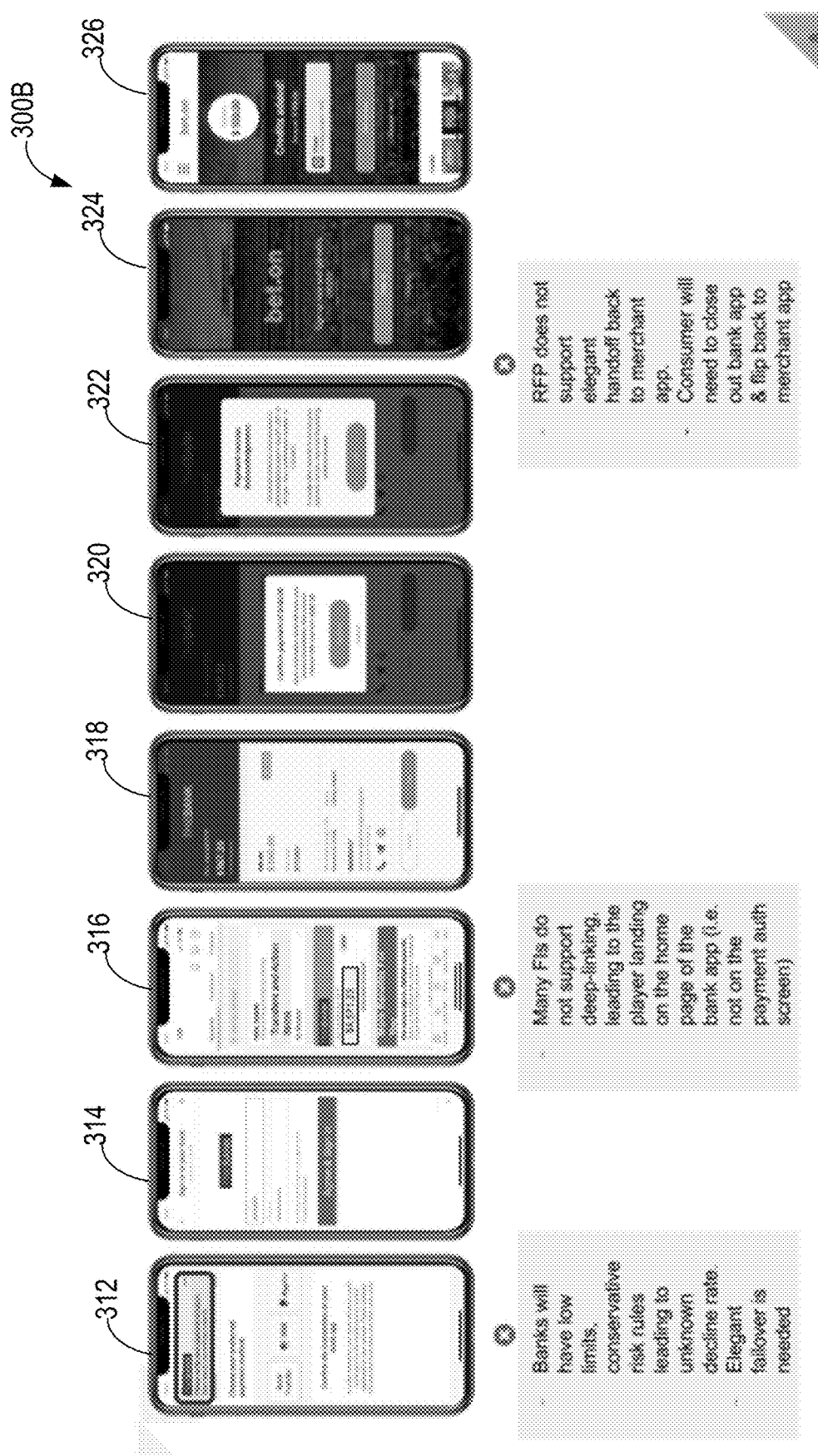

FIGS. 3A-3B illustrate example graphical user interfaces (GUIs) without the streamlined method of the present technology and certain technical issues that can occur. In a first screen 302 and a second screen 304, the user may sign in to a merchant application and make an account. In a third screen 306, the user may be required to deposit funds before continuing into the application. Natively on the merchant application, in a fourth screen 308, there may be a failure associated with a bank API connection, or a wrong data input may occur with inputting banking information.

In a fifth screen 310, in order to continue with the process, a notification is sent to the banking system and a notification may not be presented to the user for a number of reasons (i.e., the banking application is not responding, bank declined the transaction, etc.). In such a case, there is no fallback option and the user cannot continue with payment using the current banking system. In a sixth screen 312, a push notification may be sent from the banking application, given that a large percentage of users may not have push notifications enabled globally or for the banking application. In addition, banks may have low limits, conservative risk rules leading to unknown decline rates, such that an elegant failover, such as present technology, is needed.

In a seventh screen 314, the user may select the push notification, requiring the user to sign into the banking application. Once signed into the banking application, as shown in the eighth screen 316, the banking application may fail to deep-link properly and fail to lead to the payment authentication screen and may merely lead to the home pay of the banking application. In a ninth screen 318, details pertaining to the RfP are displayed at the banking application. A confirmation request may be displayed at a tenth screen 320, and a notification that the RfP has been authorized may be displayed in an eleventh screen 322. Then, the user needs to switch back to the merchant application given that there is no elegant handoff back to the merchant application, which is another friction point.

Figure 4:
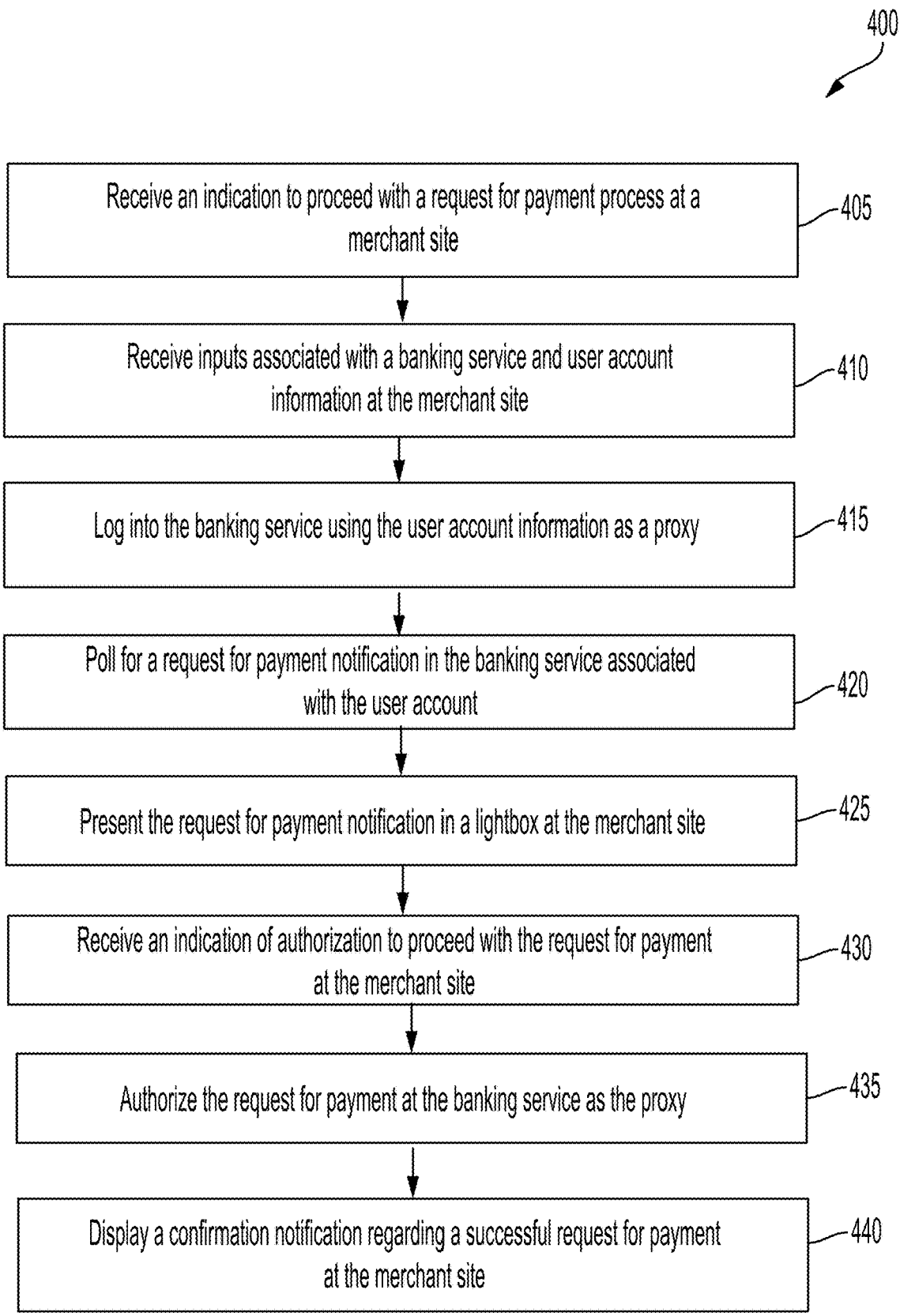
FIG. 4 illustrates steps of an example process for streamlining approvals for RfPs, according to some aspects of the disclosed technology, according to some aspects of the disclosed technology.

FIG. 4 illustrates steps of an example process 400 for streamlining approvals for RfPs, according to some aspects of the disclosed technology. Process 400 begins with step 405, wherein an indication may be received to proceed with a Request for Payment process at the merchant website. In step 410, inputs are received at a merchant website, the inputs are associated with a banking system and user account information. In some implementations, the software connector receives the information from the merchant website, or the software connector may directly receive the inputs via a lightbox at the merchant website. The merchant website may be a website, application, or other kinds of platforms.

In step 415, the software connector may log into the banking system using the user account information, serving as a proxy. Then, when the software connector is logged in, in step 420, the software connector may poll for a Request for Payment notification in the banking system associated with the user account. More specifically, the software connector may poll for specific information associated with the present Request for Payment to poll for the correct and respective Request for Payment, or for the most recent Request for Payment.

In step 425, the software connector may present the Request for Payment notification in a lightbox at the merchant website. The notification may require that the user confirm and authorize the Request for Payment. In step 430, the software connector may receive an indication of authorization to proceed with the Request for Payment at the merchant website. In step 435, the software connector may authorize the Request for Payment at the banking system, continuing to serve as the proxy. In step 440, a confirmation may be displayed at the merchant website regarding a successful Request for Payment.

Figure 5:
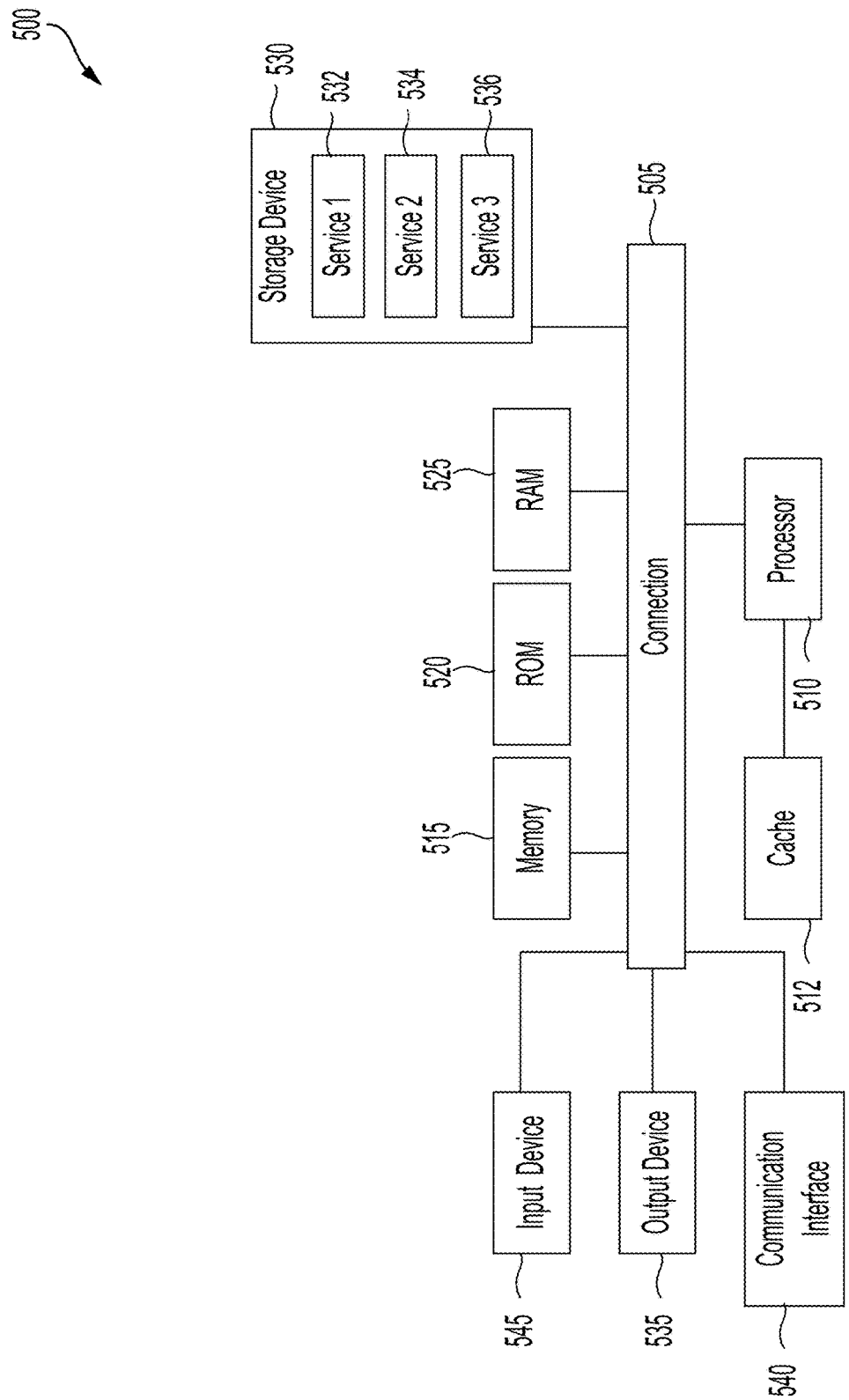
FIG. 5 illustrates an example processor-based system with which some aspects of the subject technology can be implemented, according to some aspects of the disclosed technology.

FIG. 5 illustrates an example processor-based system with which some aspects of the subject technology can be implemented. For example, processor-based system 500 that can be any computing device that is configured to generate and/or display customized video content for a user and/or which is used to implement all, or portions of, a multimedia editing/playback platform, as described herein. By way of example, system 500 can be a personal computing device, such as a smart phone, a notebook computer, or a tablet computing device, etc. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, and/or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output.

The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD)

optical disc, a Blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

By way of example, processor 510 may be configured to execute operations for streamlining approvals for RfPs. By way of example, processor 510 may be provisioned to execute any of the operations discussed above with respect to process 100 or 400, described in relation to FIG. 1 or 4. By way of example, processor 510 may be configured to receive an indication to proceed with a Request for Payment process at a merchant website. In some aspects, the processor 510 may receive inputs associated with a banking system and user account information at a merchant website. In some aspects, processor 510 may be further configured to log into the banking system using the user account information as a proxy.

In some aspects, processor 510 may be further configured for polling for a Request for Payment notification in the banking system associated with the user account. In some aspects, processor 510 can be further configured to present the Request for Payment notification in a lightbox at the merchant website. In some aspects, processor 510 can be further configured to authorize the Request for Payment at the banking system as the proxy. In some aspects, processor 510 can be further configured to display a confirmation notification regarding a successful Request for Payment at the merchant website.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

The invention claimed is:

1. A method for integrating requests across different online applications, the method comprising:
   storing information regarding a plurality of different software connectors in memory, wherein each software connector is programmed to facilitate communications between a different set of online applications;
   processing a request received at a server, the request associated with a user accessing a first online application, wherein the user is further associated with a second online application;
   identifying a software connector from among the stored software connectors that is associated with the first online application and the second online application, wherein the identified software connector facilitates back-end instructions between the first online application and the second online application;
   generating a display of a custom lightbox interface that responds to the back-end instructions by the identified software connector;
   triggering the second online application via the identified software connector, wherein the second online application is triggered to originate a request through a third online application to the second online application in accordance with the request received associated with the user accessing the first online application; and generating a notification display for the custom lightbox interface associated the first online application, wherein the notification display presents the request originated by the second online application without requiring the user to leave the first online application.

2. The method of claim 1, further comprising identifying that the user is associated with the second online application by prompting the user to select from among a plurality of available online applications associated with the stored connectors.

3. The method of claim 1, further comprising retrieving the request originated by the second online application from within an associated interface of the second online application, wherein generating the notification display is based on the retrieved request.

4. The method of claim 3, wherein the request is retrieved after a predetermined period of time following triggering of the second online application.

5. The method of claim 1, further comprising routing the request associated with the user accessing the first online application based on a risk assessment in accordance with historical data.

6. The method of claim 1, further comprising determining that the request originated by the second online application is declined, and seamlessly initiating a different type of request associated with the second online application as a failover based on the originated request being declined.

7. The method of claim 1, wherein the notification display includes a payment authorization screen associated with the second online application.

8. The method of claim 1, wherein one or more interfaces of the second online application are hidden, and wherein a display of a user device of the user does not present the hidden interfaces.

9. The method of claim 1, wherein the request originated by the second online application concerns payment from an account of the user, and wherein the account is associated with the second online application.

10. The method of claim 1, further comprising determining that the second online application is eligible for originated request, wherein triggering the second online application to originate the request is based on the determined eligibility.

11. The method of claim 1, further comprising polling for a notification of the request via the identified software connector as a proxy within the second online application, and determining confirmation of the notification when the notification is found.

12. The method of claim 11, further comprising determining that no confirmation is found for a different request, and identifying one or more alternatives for processing the request using one or more other software connectors via the custom lightbox interface.

13. A system comprising:
a storage configured to store instructions and information regarding a plurality of different software connectors, wherein each software connector is programmed to facilitate communications between a different set of online applications; and
a processor configured to execute the instructions and cause the processor to:
process a request associated with a user accessing a first online application, wherein the user is further associated with a second online application;
identify a software connector from among the stored software connectors that is associated with the first online application and the second online application, wherein the identified software connector facilitates back-end instructions between the first online application and the second online application;
generate a display of a custom lightbox interface that responds to the back-end instructions by the identified software connector;
trigger the second online application via the identified software connector, wherein the second online application is triggered to originate a request through a third online application to the second online application, in accordance with the request received associated with the user accessing the first online application; and
generate a notification display in the custom lightbox interface associated the first online application, wherein the notification display presents the request originated by the second online application without requiring the user to leave the first online application.

14. The system of claim 13, wherein the processor is configured to execute the instructions and cause the processor to: identify that the user is associated with the second online application by prompting the user to select from among a plurality of available online applications associated with the stored connectors.

15. The system of claim 13, wherein the processor is configured to execute the instructions and cause the processor to: retrieve the request originated by the second online application from within an associated interface of the second online application, wherein generating the notification display is based on the retrieved request.

16. The system of claim 15, wherein the request is retrieved after a predetermined period of time following triggering of the second online application.

17. The system of claim 13, wherein the processor is configured to execute the instructions and cause the processor to: route the request associated with the user accessing the first online application based on a risk assessment in accordance with historical data.

18. The system of claim 13, wherein determining that the request originated by the second online application is declined.

19. The system of claim 13, wherein the notification display includes a payment authorization screen associated with the second online application.

20. The system of claim 13, wherein one or more interfaces of the second online application are hidden, and wherein a display of a user device of the user does not present the hidden interfaces.

21. A non-transitory computer-readable storage medium comprising instructions executable by a computing system to:
store information regarding a plurality of different software connectors in memory, wherein each software connector is programmed to facilitate communications between a different set of online applications;
process a request associated with a user accessing a first online application, wherein the user is further associated with a second online application;
identify a software connector from among the stored software connectors that is associated with the first online application and the second online application, wherein the identified software connector facilitates back-end instructions between the first online application and the second online application;

generate a display of a custom lightbox interface that responds to the back-end instructions by the identified software connector;

trigger the second online application via the identified software connector, wherein the second online application is triggered to originate a request through a third online application to the second online application, in accordance with the request received associated with the user accessing the first online application; and generate a notification display in the custom lightbox interface associated the first online application, wherein the notification display presents the request originated by the second online application without requiring the user to leave the first online application.

22. The non-transitory computer-readable storage medium of claim 21, further comprising instructions executable to identify that the user is associated with the second online application by prompting the user to select from among a plurality of available online applications associated with the stored connectors.

* * * * *